(12) United States Patent
Kemmochi et al.

(10) Patent No.: US 7,167,687 B2
(45) Date of Patent: Jan. 23, 2007

(54) SWITCH CIRCUIT AND COMPOSITE HIGH-FREQUENCY PART

(75) Inventors: Shigeru Kemmochi, Meerbusch (DE); Mitsuhiro Watanabe, Saitama-ken (JP); Keisuke Fukamachi, Saitama-ken (JP); Hiroyuki Tai, Tottori-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 94 days.

(21) Appl. No.: 10/502,982

(22) PCT Filed: Jan. 31, 2003

(86) PCT No.: PCT/JP03/00952

§ 371 (c)(1),
(2), (4) Date: Nov. 1, 2004

(87) PCT Pub. No.: WO03/065604

PCT Pub. Date: Aug. 7, 2003

(65) Prior Publication Data

US 2005/0048927 A1 Mar. 3, 2005

(30) Foreign Application Priority Data

Jan. 31, 2002 (JP) ............................. 2002-024029

(51) Int. Cl.
H04B 1/44 (2006.01)

(52) U.S. Cl. ............................. 455/78; 455/79; 455/80; 333/100

(58) Field of Classification Search ............... 455/78, 455/79, 80, 81, 82, 83, 84; 333/100, 101
See application file for complete search history.

(56) References Cited

U.S. PATENT DOCUMENTS 6,633,748 B1 * 10/2003 Watanabe et al. ............. 455/78

6,768,898 B2 * 7/2004 Furutani et al. .............. 455/82

FOREIGN PATENT DOCUMENTS

EP 0 744 831 A2 11/1996

(Continued)

OTHER PUBLICATIONS

European Search Report dated Mar. 14, 2005.

*Primary Examiner*—Quochien B. Vuong
*Assistant Examiner*—Tuan H. Nguyen
(74) *Attorney, Agent, or Firm*—Finnegan, Henderson, Farabow, Garrett & Dunner, LLP

(57) ABSTRACT

A switch circuit for selectively switching connection of an antenna side circuit with a reception circuit and a transmission circuit of two communication systems one of which has a reception frequency band partially overlapped with a transmission frequency of the other. The switch circuit includes (a) a first switch unit for switching connection of the antenna side circuit with the transmission circuit side of the first and the second communication systems and the reception circuit side of the first and the second communication system and (b) a second switch unit connected between the first switch unit and the reception circuit of the first and the second communication system for switching connection of the antenna side circuit with the reception circuit of the first and the second communication system. (c) The transmission circuit side of the first and the second communication system of the first switch unit is connected to a transmission circuit shared by the first and the second communication system. (d) When the transmission circuit of the first and the second communication system is connected to the antenna side circuit, the second switch unit cuts off the connection between the reception circuit of the first communication system and the first switch unit.

17 Claims, 10 Drawing Sheets

FOREIGN PATENT DOCUMENTS

| | | |
|---|---|---|
| EP | 1 003 291 A2 | 5/2000 |
| JP | 2000-165288 | 6/2000 |
| JP | 2001-044885 | 2/2001 |
| JP | 2001-267802 | 9/2001 |
| JP | 2001-267956 | 9/2001 |
| JP | 2002-171195 | 6/2002 |
| WO | WO 00/55983 | 9/2000 |
| WO | WO 01/48935 A1 | 7/2001 |

* cited by examiner

SWITCH CIRCUIT AND COMPOSITE HIGH-FREQUENCY PART

FIELD OF THE INVENTION

The present invention relates to a switch circuit for a multi-band mobile phone, which has a capable of making communications in plural systems, and a high-frequency composite part comprising it.

BACKGROUND OF THE INVENTION

There are various systems for mobile phones, for instance, EGSM (extended global system for mobile communications) and DCS (digital cellular system) widely used mostly in Europe, GSM 850 (global system for mobile communications 850) and GSM 1900 (global system for mobile communications 1900) widely used in the U.S., and PDC (personal digital cellular system) used in Japan. According to recent rapid expansion of mobile phones, however, a frequency band allocated to each system cannot allow all users to use their mobile phones in major cities in advanced countries, resulting in difficulty in connection and thus causing such a problem that mobile phones are sometimes disconnected during communication. Thus, proposal was made to permit users to utilize a plurality of systems, thereby increasing substantially usable frequencies, and further to expand serviceable territories and to effectively use communications infrastructure of each system.

To utilize a plurality of systems, a user should conventionally have a mobile phone capable of communicating in plural systems. As a high-frequency part used in such a mobile phone, the inventors proposed a high-frequency switch module for switching transmitting circuits and receiving circuits in different communication systems (WO 00/55983).

The high-frequency switch module of WO 00/55983 comprises first and second filter circuits having different passbands, a switch circuit connected to the first filter circuit for switching a transmitting circuit and a receiving circuit of a communication system A, and a switch circuit connected to the second filter circuit for switching transmitting circuits of communication systems B, C, a receiving circuit of a communication system B and a receiving circuit of a communication system C.

The first and second filter circuits function as circuits for branching a received signal of the communication system A and received signals of the communication systems B, C. The switch circuit is a diode switch comprising a diode and a transmission line as main elements, and any one of pluralities of communication systems A, B, C is selected by controlling the diode in an ON or OFF state by applying voltage from a control circuit, thereby switching the antenna and transmitting circuits and receiving circuits of the communication systems A, B, C.

Specific examples of the communication systems A, B, C disclosed by WO 00/55983 are GSM, DCS 1800 and PCS, respectively. GSM corresponds to the EGSM, DCS 1800 corresponds to the GSM 1800, and PCS corresponds to the GSM 1900. Table 1 shows transmitting frequency and receiving frequency of each communication system.

TABLE 1

| Communication System | Transmitting Frequency (MHz) | Receiving Frequency (MHz) |
|---|---|---|
| EGSM | 880 to 915 | 925 to 960 |
| GSM 1800 | 1710 to 1785 | 1805 to 1880 |
| GSM 1900 | 1850 to 1910 | 1930 to 1990 |

JP 2000-165288 A, JP 2001-44885 A and JP 2002-171195 A disclose high-frequency composite parts used in pluralities of different communication systems.

With respect to GSM 1800 and GSM 1900 among communication systems handled by such high-frequency composite parts, it is appreciated that the transmitting frequency of GSM 1900 overlaps the receiving frequency of GSM 1800 in a range of 1850 MHz to 1880 MHz.

Problems in a case where the receiving frequency of the first communication system (GSM 1800) partially overlaps the transmitting frequency of the second communication system (GSM 1900) in the conventional high-frequency switch module for handling GSM 1800 and GSM 1900 described in WO 00/55983 will be explained using the equivalent circuit shown in FIG. 21.

This high-frequency switch module selects a transmitting mode of GSM 1800/GSM 1900, a receiving mode of GSM 1800, and a receiving mode of GSM 1900, by controlling voltage applied from control terminals as shown in Table 2.

TABLE 2

| Mode | VC2 | VC3 |
|---|---|---|
| GSM 1800 TX (Transmitting) | V+ | 0 |
| GSM 1900 TX (Transmitting) | V+ | 0 |
| GSM 1800 RX (Receiving) | 0 | 0 |
| GSM 1900 RX (Receiving) | 0 | V+ |

(A) GSM 1800/GSM 1900 transmitting mode

In the transmitting mode of GSM 1800 or GSM 1900, positive voltage (V+) is applied to a control terminal VC2, and zero voltage is applied to a control terminal VC3, to control diodes DD1, DD2 in an ON state. A transmission line ld3 has such proper length that its resonance frequency is in a frequency range (1710 MHz to 1910 MHz) of transmitting signals of GSM 1800 and GSM 1900, and grounded through the diode DD2 in an ON state and a capacitor cd4 for resonance. As a result, impedance is large (ideally infinitive) when the receiving circuits of GSM 1800 and GSM 1900 are viewed from the connection point IP2. Accordingly, transmitting signals sent from the transmitting circuit of GSM 1800 and GSM 1900 are sent to an antenna via the second filter circuit without leaking to the receiving circuit. At this time, the diodes DP1, DP2 are controlled in an OFF state.

However, because impedance is practically not sufficiently large in other frequencies than the resonance frequency when the receiving circuits of GSM 1800 and GSM 1900 are viewed from a connection point IP2, part of the transmitting signals of GSM 1800 and GSM 1900 (hereinafter referred to as "leak signals") leak to the receiving circuits of GSM 1800 and GSM 1900 via the transmission line ld3. In addition, the resonance frequency may be changed by the unevenness of the capacitance of the capacitor cd4 and a capacitance component parasitic to the transmission line ld3, resulting in further increase in a signal leaking to the receiving circuits of GSM 1800 and GSM 1900.

Specifically, because the diodes DP1, DP2 are in an OFF state in the case of transmitting mode in GSM 1800, the leak signal does not appear in the receiving circuit of GSM 1900 by isolation when the diode DP1 is in an OFF state. On the other hand, the leak signal appearing in the receiving circuit of GSM 1800 via the transmission line lp2 is removed by a filter circuit (not shown) disposed upstream of the receiving circuit, resulting in substantially no leakage to the receiving circuit of GSM 1800. In the case of transmitting mode in GSM 1900, however, a leak signal of 1850 MHz to 1880 MHz overlapping the receiving frequency of GSM 1800 among those in a transmitting frequency of GSM 1900 appearing in the receiving circuit of GSM 1800 is supplied to the receiving circuit of GSM 1800 without being removed by the filter circuit, entering into analog-processing ICs constituting an LNA (low-noise amplifier)and a mixer in the receiving circuit and a modulator/demodulator, and thus causing the malfunction of these circuit parts.

(B) GSM 1800 Receiving Mode

In a receiving mode in GSM 1800, the diodes DP1, DP2, DD1 and DD2 are controlled in an OFF state by applying zero voltage to the control terminals VC2 and VC3. With the diode DD1 in an OFF state, impedance is large between the connection point IP2 and the transmitting circuit of GSM 1800/GSM 1900. With the diode DP1 in an OFF state, impedance is large between the connection point IP3 and the receiving circuit of GSM 1900. The connection point IP2 is thus connected to the receiving circuit of GSM 1800 via transmission lines ld3 and lp2.

(C) GSM 1900 Receiving Mode

In the receiving mode in GSM 1900, positive voltage is applied to the control terminal VC3, and zero voltage is applied to the control terminal VC2, to control the diodes DD1, DD2 in an OFF state and the diodes DP1, DP2 in an ON state. With the diode DD1 in an OFF state, impedance is large between the connection point IP2 and the transmitting circuit of GSM 1800/GSM 1900. The transmission line lp2 has such length that it is resonated at 1930 MHz to 1990 MHz in a frequency range of the received signal of GSM 1900. Accordingly, it is grounded through the diode DP2 in an ON state and the capacitor CP1 for resonance, resulting in large impedance when the receiving circuit of GSM 1800 is viewed from the connection point IP3. The connection point IP2 is thus connected to the receiving circuit of GSM 1900.

The diodes DP1, DP2 for switching the receiving circuits of GSM 1800 and GSM 1900 usually have low power consumption and small insertion loss. Such diodes are generally more likely subjected to distortion than diodes with large power consumption in an OFF state. Accordingly, the diodes DP1, DP2 in an OFF state are likely to distort the transmitting signals of GSM 1800, GSM 1900 leaking via the transmission line ld3, thereby generating harmonics having frequencies corresponding to integral multiples of those of these transmitting signals. These harmonics, which are added to the transmitting signals of GSM 1800, GSM 1900, are radiated from the antenna. With respect to such problems, none of WO 00/55983 JP 2000-165288 A, JP 2001-44885 A and JP 2002-171195 A provides any solutions.

OBJECTS OF THE INVENTION

Accordingly, an object of the present invention is to provide a switch circuit for a high-frequency composite part for use in a mobile phone with a capable of handling pluralities of communication systems, which suffers from extremely small leakage of transmitting signals to receiving circuits, thus having extremely large isolation, when handling communication systems having partially overlapping transmitting/receiving signals.

Another object of the present invention is to provide a switch circuit with suppressed generation of harmonics without suffering from increase in power consumption.

DISCLOSURE OF THE INVENTION

The first switch circuit of the present invention selectively switches the connection of a receiving circuit or a transmitting circuit in two communication systems, in which a receiving frequency bandwidth in a first communication system partially overlaps a transmitting frequency bandwidth in a second communication system, and an antenna circuit;

(a) it comprising two switches, a first switch switching the connection of the antenna circuit to transmitting circuit of first and second communication systems and the connection of the antenna circuit to receiving circuits of first and second communication systems, and a second switch being connected between the first switch and the receiving circuit of the first and second communication systems to switch the connection of the antenna circuit to the receiving circuit of the first communication system via the first switch, and the connection of the antenna circuit to the receiving circuit of the second communication system via the first switch;

(b) a transmitting circuit common to the first and second communication systems being connected to the transmitting circuit of the first and second communication systems in the first switch; and (c) the second switch disconnecting the receiving circuit of the first communication system from the first switch, while the transmitting circuit of the first and second communication systems is connected to the antenna circuit.

The switch circuit preferably comprises switching elements, inductors and capacitors. There is preferably a capacitor between the first switch and the second switch.

The switching element of the present invention is constituted by semiconductor elements performing switching operations by changing impedance, such as field-effect transistors, bipolar transistors, PIN diodes, etc. The field-effect transistor is made conductive or non-conductive by changing impedance between a source and a drain by control voltage applied from a gate. The PIN diode is made conductive or non-conductive by changing impedance between an anode and a cathode by control voltage. The inductor is, for instance, a transmission line such as a strip line electrode, a microstrip line electrode, etc., a coil, a chip inductor, etc. The capacitor is, for instance, a laminate capacitor constituted by capacitor electrodes, a chip capacitor, etc. These elements may properly be selected depending on demanded requirements.

The second switch circuit of the present invention selectively switches the connection of a receiving circuit or a transmitting circuit for two communication systems, in which a receiving frequency bandwidth in the first communication system partially overlaps a transmitting frequency bandwidth in the second communication system, and an antenna circuit;

(a) the switch circuit, which comprises switching elements, inductors and capacitors, being constituted by a first switch and a second switch, the first switch comprising a first port connected to the antenna circuit, a second port connected to the transmitting circuit of the first and second communication systems, and a third port connected to the second switch, and the second switch comprising a fourth port connected to the first switch via a capacitor, a fifth port connected to the receiving circuit of the first communication system, and a sixth port connected to the receiving circuit of the second communication system;

(b) a first inductor being disposed between the fourth port and the fifth port;

(c) a first switching element being disposed between the fifth port and the ground;

(d) a second switching element being disposed between the fourth port and the sixth port; and (e) the first and second switching elements being controlled in an ON state while the transmitting circuit of the first and second communication systems is connected to the antenna circuit.

The first inductor is preferably a transmission line having such length that resonance occurs in a receiving frequency range of the second communication system. With such structure, the first inductor is grounded at high frequencies through the first switching element in an ON state for resonance, and impedance is relatively large in a receiving frequency of the second communication system, when the fifth port connected to the receiving circuit of the first communication system is viewed from the fourth port. Because impedance is also high in a transmitting frequency of the second communication system, a leak signal from the first switch, which appears in the fourth port, is attenuated, thereby making it possible to suppress leakage to the receiving circuit of the first communication system.

Though a leak signal having a frequency close to the receiving frequency of the second communication system may appear in the sixth port via the second switching element, the leak signal is removed by a filter circuit disposed downstream between the sixth port and the receiving circuit of the second communication system. Accordingly, the leak signal substantially does not leak to the receiving circuit of the second communication system. Also, because the switching element of the second switch is in an ON state, the generation of harmonics can be prevented.

The third switch circuit of the present invention selectively switches the connection of a receiving circuit or a transmitting circuit for two communication systems, in which a receiving frequency bandwidth in the first communication system partially overlaps a transmitting frequency bandwidth in the second communication system, and an antenna circuit;

(a) the switch circuit, which comprises switching elements, inductors and capacitors, being constituted by a first switch and a second switch, the first switch comprising a first port connected to the antenna circuit, a second port connected to the transmitting circuit of the first and second communication systems, and a third port connected to the second switch, and the second switch comprising a fourth port connected to the first switch via a capacitor, a sixth port connected to the receiving circuit of the first communication system, and a fifth port connected to the receiving circuit of the second communication system;

(b) a first inductor being disposed between the fourth port and the fifth port;

(c) a first switching element being disposed between the fifth port and the ground;

(d) a second switching element being disposed between the fourth port and the sixth port; and (e) the first and second switching elements being controlled in an OFF state, while the transmitting circuit of the first and second communication systems is connected to the antenna circuit.

With such structure, the second switching element has isolation characteristics in an OFF state, preventing the leak signal from leaking to the receiving circuit of the first communication system. Though the first inductor is designed to resonate in a receiving frequency range of the first communication system, the leak signal may appear in the fifth port via the first inductor. However, the leak signal is removed by a downstream filter circuit disposed between the fifth port and the receiving circuit of the second communication system, so that it does not leak to the receiving circuit of the second communication system.

In the second and third switch circuits, the first switch comprises a third switching element disposed between the first port and the second port, a second inductor disposed between the first port and the third port, and a fourth switching element disposed between the third port and the ground, and when the transmitting circuit of the first and second communication systems is connected to the antenna circuit, the third and fourth switching elements are preferably controlled in an ON state.

More preferably, the fourth switching element comprises a diode, and a first capacitor is disposed between the diode and the ground. The diode generally has an inductance component because of lead terminals, etc. It also has parasitic inductance because of line patterns for connecting the diode to other circuit elements, etc., so that a completely short-circuited state is not necessarily achieved even when the diode is turned on.

This makes impedance smaller when the third port is viewed from the first port, resulting in poor isolation and insertion loss characteristics. Accordingly, the first capacitor is disposed in series to the fourth switching element for series resonance in the present invention, such that impedance is large when the third port is viewed from the first port, thereby reducing a transmitting signal leaking to the second switch and thus improving isolation and insertion loss characteristics.

In the second and third switch circuits, the operation current of the switching element of the second switch is preferably lower than that of the switching element of the first switch. Using a switching element operable with current of 2.5 mA or less, particularly 1 mA or less at a temperature of 0° C. to +85° C., power consumption can be reduced at the time of transmitting and receiving, resulting in reduced battery consumption of mobile phones.

In the second and third switch circuits, the first switch and the second switch can be made composite by making the characteristic impedance of the first inductor higher than that of the second inductor, thereby making it easy to achieve impedance matching in the production of the switch circuit.

The high-frequency composite part of the present invention comprises either of the first to third switch circuits, switching elements, inductors and capacitors being contained in or mounted onto a multi-layered ceramic substrate obtained by laminating pluralities of ceramic sheets, and connected by connection means formed in or on the multi-layered substrate.

In the high-frequency composite part, transmission lines constituting the first and second inductors are preferably contained in the multi-layered substrate, and these transmission lines are preferably formed in horizontally different regions in the multi-layered substrate. Such structure not only prevents their interference, but also prevents the resonance frequency and characteristic impedance of these transmission lines from changing due to parasitic capacitance, etc., thereby improving isolation characteristics, and making it easy to achieve impedance matching between the first switch and second switch. Further, when the transmission lines are formed as strip line electrodes in a region sandwiched by ground electrodes formed in the multi-layered substrate, their interference with electrode patterns constituting other circuit elements can preferably be prevented.

Impedance may be changed by forming the first inductor and/or the second inductor by connecting transmission lines formed on two layers or more through viaholes, and by making the width of a transmission line formed on one layer different from the width of transmission lines formed on other layers. Such structure makes it easy to achieve impedance matching with circuits disposed upstream or downstream of the transmission lines.

It is preferable that the fourth switching element is a diode, that the first capacitor disposed between this diode and the ground is contained in the multi-layered substrate, and that a hot-side electrode constituting the first capacitor is disposed above an upper ground electrode among those sandwiching transmission lines constituting the first and second inductors. The capacitor electrodes are connected to diodes through viaholes formed in the multi-layered substrate, and the diodes are mounted onto an upper surface of the multi-layered substrate. Accordingly, the above structure can make the distances between the diodes and the capacitor electrodes smaller, thereby reducing parasitic inductance and thus obtaining high isolation characteristics.

In the second switch, too, the first switching element may be a diode, and the second capacitor may be disposed between this diode and the ground to obtain high isolation characteristics. If a hot-side electrode constituting the first capacitor and a hot-side electrode constituting the second capacitor are formed on the same layer via a common ground electrode and a ceramic layer, they are less affected by lamination discrepancy in a horizontal direction, thereby making it possible to produce capacitors with uniform capacitance and thus provide stable isolation characteristics.

If one of the ground electrodes sandwiching the transmission line is a common ground electrode, the step of forming ground electrodes can be decreased, thereby making the multi-layered substrate thinner. Also, the interference of the capacitor electrode with electrode patterns constituting other circuit elements, the switching elements such as diodes mounted onto the multi-layered substrate, etc. and other mounted parts is reduced by sandwiching the capacitor electrode on the hot side by the ground electrodes.

BEST MODE FOR CARRYING OUT THE INVENTION

[1] First embodiment

Figure 1:
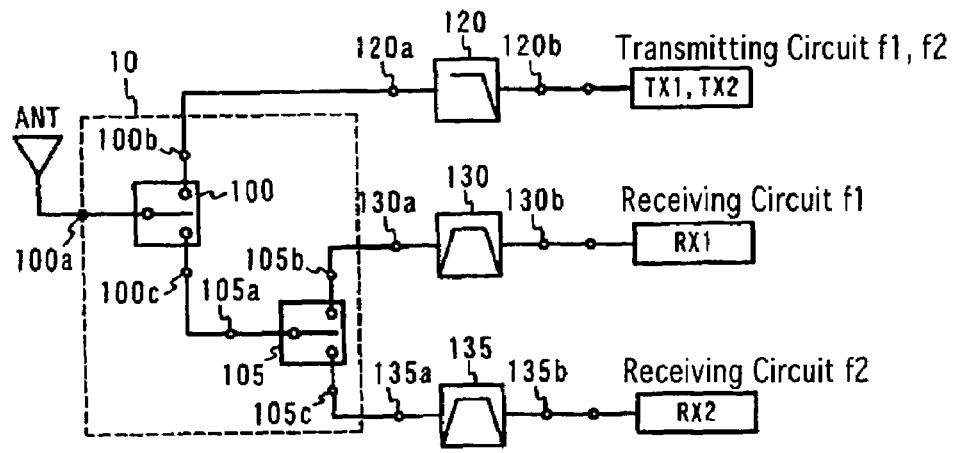
FIG. 1 is a block diagram showing a high-frequency circuit comprising a switch circuit according to one embodiment of the present invention.
Figure 2:
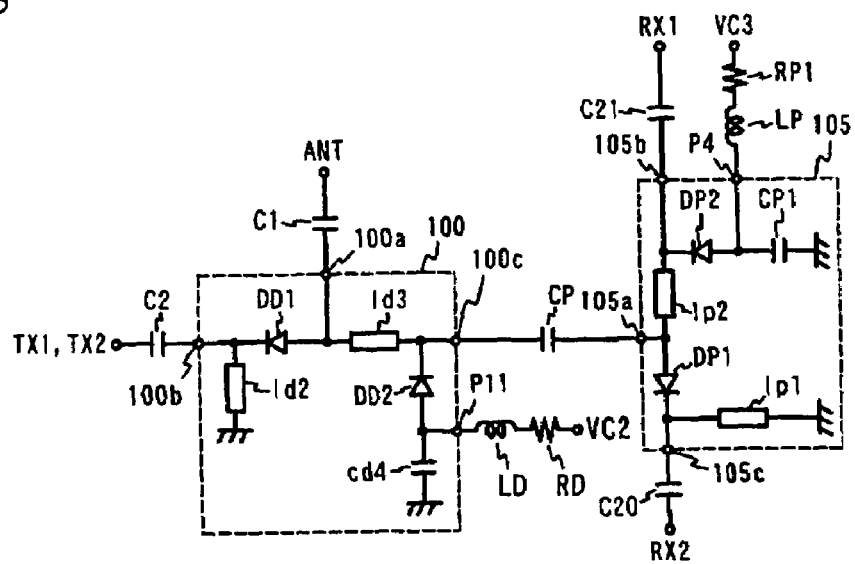
FIG. 2 is a view showing an equivalent circuit of the switch circuit according to one embodiment of the present invention.

FIG. 1 shows a high-frequency circuit comprising a switch circuit according to one embodiment of the present invention, and FIG. 2 shows the equivalent circuit of the switch circuit. It is assumed below for the simplification of explanation without intention of restricting the present invention that among pluralities of communication systems, a first communication system f1 is GSM 1800 (transmitting frequency: 1710 to 1785 MHz, receiving frequency: 1805 to 1880 MHz), and a second communication system f2 is GSM 1900 (transmitting frequency: 1850 to 1910 MHz, receiving frequency: 1930 to 1990 MHz).

This switch circuit is constituted by a first switch 100 and a second switch 105 both comprising switching elements, inductors and a capacitor. The first switch 100 comprises a first port 100*a* connected to an antenna circuit, a second port 100b connected to transmitting circuit of GSM 1800 and GSM 1900, and a third port 100c connected to a second switch 105. The second switch 105 comprises a fourth port 105a connected to the first switch 100 via a capacitor CP, a fifth port 105b connected to the receiving circuit of GSM 1800, and a sixth port 105c connected to the receiving circuit of GSM 1900. The second switch 105 comprises a transmission line lp2 as a first inductor disposed between the fourth port 105a and the fifth port 105b, a diode DP2 as a first switching element disposed between the fifth port 105b and the ground, a capacitor CP1 as a second capacitor disposed between the first diode DP2 and the ground, a diode DP1 as a second switching element disposed between the fourth port 105a and the sixth port 105c, and a transmission line or inductor lp1 disposed between the sixth port 105c and the ground.

The second switch 105 switches the receiving circuit RX1 of GSM 1800 and the receiving circuit RX2 of GSM 1900, and the first switch 100 switches the transmitting circuit TX1, TX2 of GSM 1800/GSM 1900 and the second switch circuit 105. The second switch 105 has as main elements two diodes DP1, DP2 as switching elements, and transmission lines lp1, lp2 as inductors (or an inductor in place of the transmission line lp1). The diode DP1 having an anode connected to the fourth port 105a and a cathode connected to the receiving circuit RX2 of GSM 1900, and a grounded transmission line lp1 is disposed on the cathode side.

A transmission line lp2 is connected between the fourth port 105a and the fifth port 105b, and the fifth port 105b is connected to a diode DP2 connected to the ground via the capacitor CP1. A control circuit VC3 is connected between the diode DP2 and the capacitor CP1 via an inductor LP and a resistor RP1.

Disposed upstream of the second switch 105 is the first switch 100 for switching the transmitting circuit TX1, TX2 of GSM 1800/GSM 1900 and the second switch. The first switch 100 has two diodes DD1, DD2 and two transmission lines ld2, ld3 (or an inductor in place of the transmission line ld2) as main elements.

A diode DD1 disposed between the second port 100b and the first port 100a has an anode connected to the first port 100a and a cathode connected to a transmission line ld2 connected to the ground. A transmission line ld3 is connected between the first port 100a and the third port 100c, and a diode DD2 connected to the ground via a capacitor cd4 is disposed on the side of the third port 100c. A control circuit VC2 is connected between the diode DD2 and the capacitor cd4 via an inductor LD and a resistor RD.

The control logic of the control circuits VC2, VC3 for causing the switch circuit in this embodiment to perform the predetermined operation is shown in Table 3. Voltage is applied from the control circuits to control the switching elements in an ON or OFF state, thereby selecting a transmitting mode of GSM 1800/GSM 1900, a receiving mode of GSM 1800, and a receiving mode of GSM 1900.

TABLE 3

| Mode | VC2 | VC3 |
|---|---|---|
| GSM 1800 TX (Transmitting) | V+ | V+ |
| GSM 1900 TX (Transmitting) | V+ | V+ |
| GSM 1800 RX (Receiving) | 0 | 0 |
| GSM 1900 RX (Receiving) | 0 | V+ |

The operation of the switch circuit will be explained below in detail.

(A) GSM 1800/GSM 1900 transmitting mode

To connect the transmitting circuit TX1, TX2 of GSM 1800 and GSM 1900 to the antenna circuit ANT, positive (high) voltage is applied from the control circuit VC2 and the control circuit VC3. Positive voltage applied from the control circuit VC2 is deprived of a DC component by the capacitors C1, C2, cd4, CP, and supplied to the first switch 100 including the diodes DD1, DD2. As a result, the diodes DD1, DD2 are turned on. When the diode DD1 is in an ON state, there is small impedance between the second port 100b and the first port 100a. In addition, the transmission line ld3 is grounded at high frequencies through the diode DD2 in an ON state and the capacitor cd4, causing resonance, and thus making impedance high when the third port 100c is viewed from the first port 100a.

Further, positive voltage applied from the control circuit VC3 is deprived of a DC component by capacitors CP, C20, C21, CP1, and supplied to the switch circuit 105 including the diodes DP1, DP2. As a result, the diodes DP1, DP2 are turned on. The transmission line lp2 grounded at high frequencies through the diode DP2 in an ON state and the capacitor CP1, causing resonance, so that there is large impedance when the fifth port 105b is viewed from the fourth port 105a.

With the above structure, there is extremely large impedance in a line from the first port 100a to the receiving circuit RX1 of GSM 1800 when the transmitting signal of GSM 1900 is sent to the antenna circuit. Accordingly, the leakage of the transmitting signal of GSM 1900 to the receiving circuit RX1 of GSM 1800 can be reduced.

Figure 6:
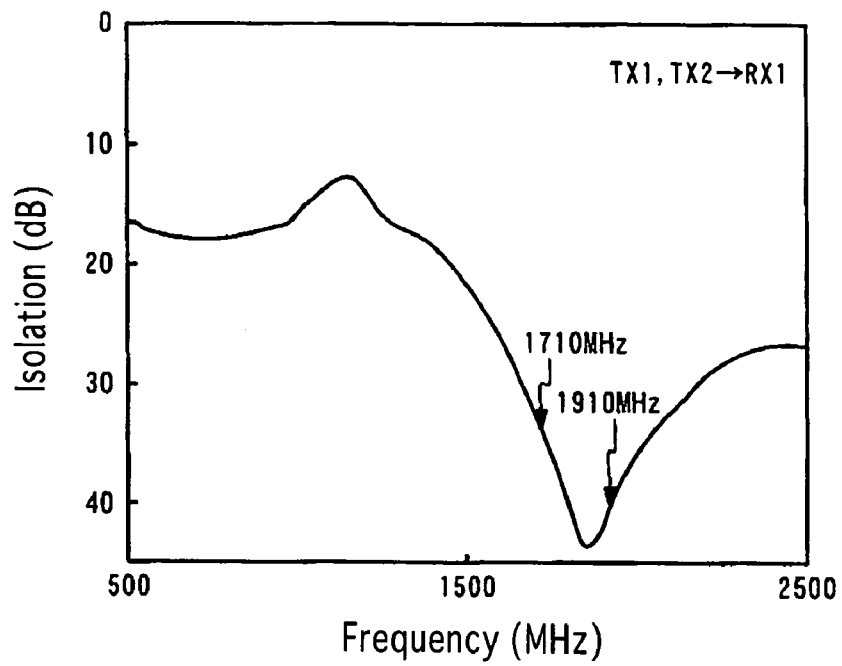
FIG. 6 is a graph showing isolation characteristics between TX1, TX2 and RX1 in a GSM 1800/GSM 1900 transmitting mode in the switch circuit according to one embodiment of the present invention.
Figure 7:
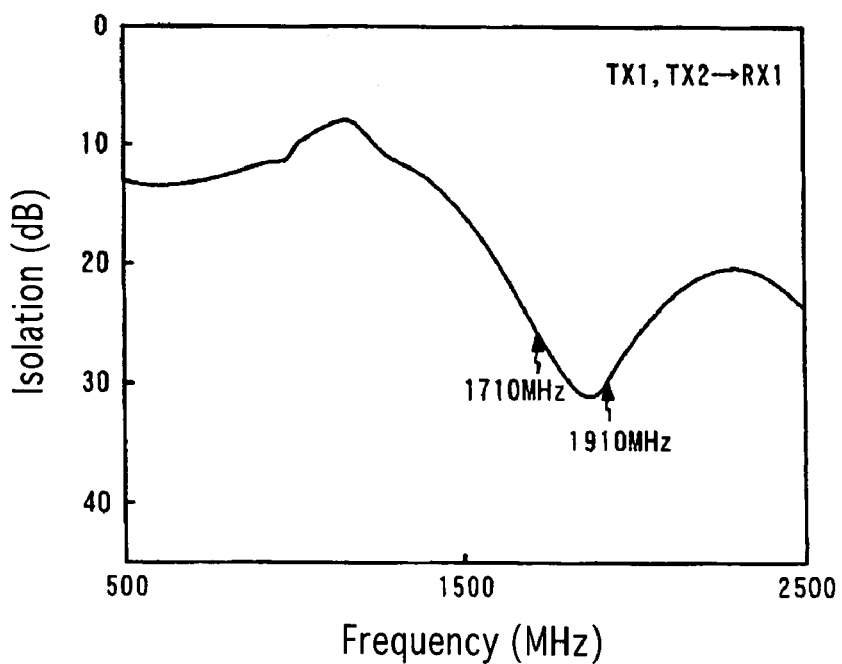
FIG. 7 is a graph showing isolation characteristics between TX1, TX2 and RX1 in a GSM 1800/GSM 1900 transmitting mode in a comparative switch circuit.

FIG. 6 shows isolation characteristic of TX1, TX2 to RX1 in a transmitting mode of GSM 1800/GSM 1900, when voltage (V+) of 2.6 V is applied from the control circuit VC2 and the control circuit VC3 in the switch circuit in this embodiment. FIG. 7 shows isolation characteristic of TX1, TX2 to RX1 in the same switch circuit as in FIG. 6 in a transmitting mode of GSM 1800/GSM 1900, when voltage (V+) of 2.6 V is applied from the control circuit VC2, and when voltage (0) of 0 V is applied from the control circuit VC3 (Comparative Example).

As shown in FIG. 6, the receiving circuit of the first communication system is disconnected from the first switch to obtain excellent isolation characteristics in a desired frequency bandwidth in the second switch, in a case where the transmitting circuit of the first and second communication systems are connected to the antenna circuit. Improvement in the isolation characteristics resulted in improved insertion loss characteristics between the transmitting circuit TX1, TX2 of GSM 1800 and GSM 1900 and the antenna circuit ANT. In addition, because the second switch 105 is operated with low operation current, the operation current of the first switch 100 and the second switch 105 was a little higher 8.8 mA than 8.0 mA in Comparative Example. It was further confirmed that by operating the second switch 105, harmonics radiated from the antenna were reduced by about 2 dB to 5 dB.

(B) GSM 1800 Receiving Mode

When the receiving circuit RX1 of GSM 1800 is connected to the antenna circuit ANT, zero voltage is applied from the control circuits VC2 and VC3, resulting in the diodes DP1, DP2, DD1, DD2 in an OFF state. With the diode DD1 in an OFF state, there is large impedance between the first port 100a and the second port 100b. Also, with the diode DP1 in an OFF state, there is large impedance between the fourth port 105a and the sixth port 105c. As a result, a receiving signal of GSM 1800 taken through the antenna is transmitted to the receiving circuit RX1 of GSM 1800 via the transmission lines ld3, lp2 with low loss without leaking to the transmitting circuit TX1, TX2 of GSM 1800/GSM 1900 and the receiving circuit RX2 of GSM 1900.

(C) GSM 1900 Receiving Mode

When the receiving circuit RX2 of GSM 1900 is connected to the antenna circuit ANT, zero voltage is applied from the control circuit VC2, and positive voltage is applied from the control circuit VC3. The positive voltage applied from control circuit VC3 is deprived of a DC component by capacitors, and supplied to the second switch 105 including the diodes DP1, DP2. As a result, the diodes DP1 and DP2 are turned on. With the diode DP1 in an ON state, there is low impedance between the fourth port 105a and the sixth port 105c. The diode DP2 in an ON state and the capacitor CP1 have the transmission line lp2 grounded at high frequencies, causing resonance in a frequency bandwidth of the receiving signal of GSM 1900, so that there is extremely large impedance in the bandwidth of the receiving signal of GSM 1900 when the fifth port 105b is viewed from the fourth port 105a. Further, with the diode DD1 in an OFF state, there is large impedance between the first port 100a and the second port 100b. As a result, the receiving signal of GSM 1900 taken through the antenna is transmitted to the receiving circuit RX2 of GSM 1900 with low loss without leaking to the transmitting circuit TX1, TX2 of GSM 1800/ GSM 1900 and the receiving circuit RX1 of GSM 1800.

This embodiment provides the switch circuit with extremely small leakage of the transmitting signal to the receiving circuit (extremely large isolation). In this embodiment, transmission lines, capacitors, etc. may be constituted in a multi-layered substrate made of dielectric materials, etc. by a low-temperature cofirable ceramic (LTCC) technology. The transmission lines ld2 and lp1 may be mounted onto the laminate as inductors such as chip inductors, coils, etc. together with other circuit elements (diodes, resistors, etc.).

Figure 3:
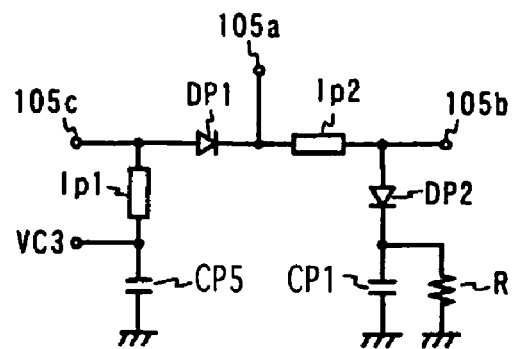
FIG. 3 is a view showing an equivalent circuit of a switch circuit according to another embodiment of the present invention.
Figure 4:
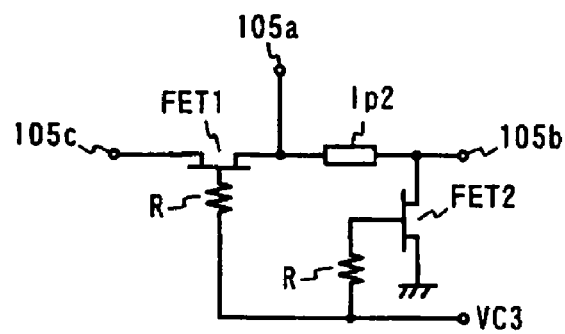
FIG. 4 is a view showing an equivalent circuit of a switch circuit according to a further embodiment of the present invention.
Figure 5:
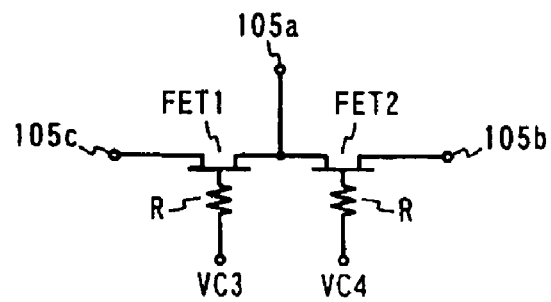
FIG. 5 is a view showing an equivalent circuit of a switch circuit according to a still further embodiment of the present invention.

FIGS. 3 to 5 shows other examples of the first switch 100 and the second switch 105. The embodiment shown in FIG. 3 uses diodes as switching elements, and the embodiments shown in FIGS. 4 and 5 use transistors as switching elements.

These embodiments will be explained below taking use in the second switch 105 for example, though the first switch 100 may also be constituted by a similar equivalent circuit. The second switch 105 comprises a diode DP1 between the fourth port 105a and the sixth port 105c. The cathode of the diode DP1 is connected to the fourth port 105a, and the transmission line lp1 connected to the ground via a capacitor CP5 is disposed on the anode side of the diode DP1. Because the transmission line lp1 functions as a choke coil, an inductor or a coil may be used instead. The transmission line lp2 is connected between the fourth port 105a and the fifth port 105b, and a diode DP2 connected to the ground via a capacitor CP1 is disposed on the side of the fifth port 105b. A resistor R is connected in parallel with the capacitor CP1. In place of this resistor R, an inductor (coil) with sufficiently large impedance may be used. A control circuit VC3 is connected between the transmission line lp1 and the capacitor CP5. Such switch circuit can also exhibit excellent effects as above.

The second switch shown in FIG. 4 comprises a transistor FET1 between the sixth port 105c and the fourth port 105a, the transistor FET1 having a drain connected to the fourth port 105a and a source connected to the sixth port 105c. The gate of the transistor FET1 is connected to a control terminal VC3 via a resistor R. A transmission line lp2 is disposed between the fourth port 105a and the fifth port 105b. A transistor FET2 is disposed on the side of the fifth port 105b, a drain is connected to the fifth port 105b and a source connected to the ground electrode. The gate of the transistor FET2 is connected to the control terminal VC3 via a resistor R.

This switch circuit can switch signal lines by voltage applied to the control terminal VC3, like other switch circuits. Incidentally, a control logic is different between a depression type and an enhancement type in the transistors FET1, FET2. Used in the operation according to the control logic shown in Table 3 is the enhancement type FET, in which impedance between the source and the drain becomes low when voltage is applied to the gate. Even with such switch circuit, excellent effects can be obtained like above.

The second switch shown in FIG. 5 comprises a transistor FET1 between the sixth port 105c and the fourth port 105a, and a transistor FET2 between the fourth port 105a and the fifth port 105b, the gates of the transistors FET1, FET2 being connected to the control terminals VC3, VC4, respectively, via resistors R.

This switch circuit can switch signal lines by voltage applied from the control terminals VC3, VC4, like other switch circuits. The series connection of pluralities of transistors can preferably suppress the generation of distortion even in an OFF state. Even with such switch circuit, excellent effects can be obtained like above.

[2] Second Embodiment

With respect to a switch circuit according to a second embodiment of the present invention, detailed explanation will be made below in a case where a first communication system is GSM 1800 (transmitting frequency: 1710 to 1785 MHz, receiving frequency: 1805 to 1880 MHz), and a second communication system is GSM 1900 (transmitting frequency: 1850 to 1910 MHz, receiving frequency: 1930 to 1990 MHz), like the first embodiment. Incidentally, because the equivalent circuit of the switch circuit in this embodiment shares many common parts with that of the first embodiment, explanation will be concentrated on different parts for simplification.

Figure 8:
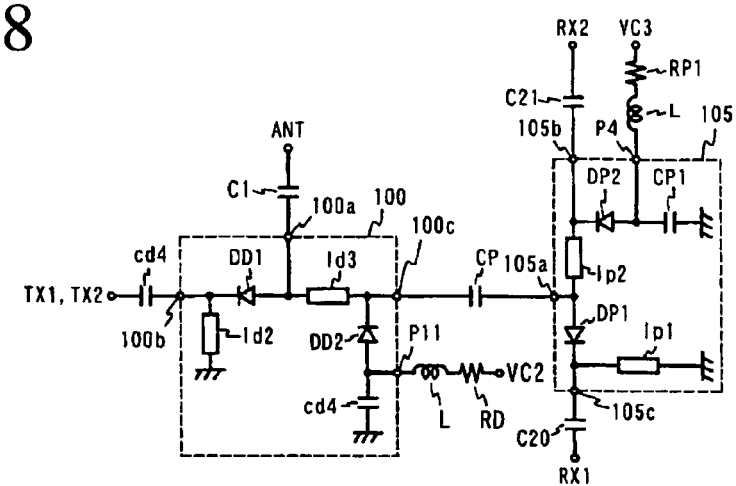
FIG. 8 is a view showing an equivalent circuit of a switch circuit according to a still further embodiment of the present invention.

The equivalent circuit of this switch circuit is shown in FIG. 8. Though it does not differ from the switch circuit of the first embodiment in an equivalent circuit, it is opposite to the first embodiment in the connection of the receiving circuits of GSM 1900 and GSM 1800 and the fifth and sixth ports in the second switch; the receiving circuit RX2 of GSM 1900 being connected to the fifth port 105b, and the receiving circuit RX1 of GSM 1800 being connected to the sixth port 105c. To have such circuit structure, the constants of the circuit elements, the length of the transmission lines, etc. are properly set in each switch circuit, and they may of course be different from those in the first embodiment.

The control logic of the control circuits VC2, VC3 for subjecting the switch circuit in this embodiment to the predetermined operation is shown in Table 4.

TABLE 4

| Mode | VC2 | VC3 |
|---|---|---|
| GSM 1800 TX (Transmitting) | V+ | 0 |
| GSM 1900 TX (Transmitting) | V+ | 0 |
| GSM 1800 RX (Receiving) | 0 | V+ |

TABLE 4-continued

| Mode | VC2 | VC3 |
|---|---|---|
| GSM 1900 RX (Receiving) | 0 | 0 |

(A) GSM 1800/GSM 1900 Transmitting Mode

To connect the transmitting circuit TX1, TX2 of GSM 1800/GSM 1900 to the antenna circuit ANT, positive voltage (V+) is applied from the control circuit VC2, and zero voltage is applied from the control circuit VC3. With zero voltage applied from the control circuit VC3, the diode DP1 is in an OFF state, resulting in large impedance between the fourth port 105a and the sixth port 105c. As a result, as in the first embodiment, the transmitting signals of GSM 1800/GSM 1900 are sent to the first port 100a with low loss without leaking to the receiving circuit RX1 of GSM 1800, and radiated from the antenna.

(B) GSM 1800 Receiving Mode

To connect the receiving circuit RX1 of GSM 1800 to the antenna circuit ANT, zero voltage is applied from the control circuit VC2, and positive voltage is applied from the control circuit VC3. The positive voltage applied from the control circuit VC3 is deprived of a DC component by capacitors C20, C21, CP, CP1, and sent to the second switch 105 including the diodes DP1, DP2. As a result, the diodes DP1 and DP2 are turned on. With the diode DP1 in an ON state, impedance is low between the sixth port 105c and the fourth port 105a. Also, with the diode DP2 in an ON state and the capacitor CP1, the transmission line lp2 is grounded at high frequencies, resulting in resonance in a frequency bandwidth of the receiving signal of GSM 1800, and thus extremely large impedance in the bandwidth of the receiving signal of GSM 1800 when the fifth port 105b is viewed from the fourth port 105a. Further, with the diode DD1 in an OFF state, impedance is large between the first port 100a and the second port 100b. As a result, the receiving signal of GSM 1800 taken through the antenna is transmitted to the receiving circuit RX1 of GSM 1800 with low loss without leaking to the transmitting circuit TX1, TX2 of GSM 1800/GSM 1900 and the receiving circuit RX2 of GSM 1900.

(C) GSM 1900 Receiving Mode

To connect the receiving circuit RX2 of GSM 1900 to the antenna circuit ANT, zero voltage is applied from the control circuits VC2 and VC3 to turn off the diodes DP1, DP2, DD1, DP2. With the diode DD1 in an OFF state, impedance is large between the first port 100a and the second port 100b. Also, with the diode DP1 in an OFF state, impedance is large between the fourth port 105a and the sixth port 105c. As a result, the receiving signal of GSM 1900 taken through the antenna is transmitted to the receiving circuit RX2 of GSM 1900 via the transmission lines ld3, lp2 with low loss without leaking to the transmitting circuit TX1, TX2 of GSM 1800/GSM 1900 and the receiving circuit RX1 of GSM 1800.

This embodiment can also provide the switch circuit with extremely small leakage of the transmitting signal to the receiving circuit (extremely large isolation).

[3] Third Embodiment

A switch circuit according to a third embodiment of the present invention will be explained below. Because the equivalent circuit of the switch circuit in this embodiment shares many parts with that of the second embodiment, explanation will be concentrated on different parts for simplification.

Figure 9:
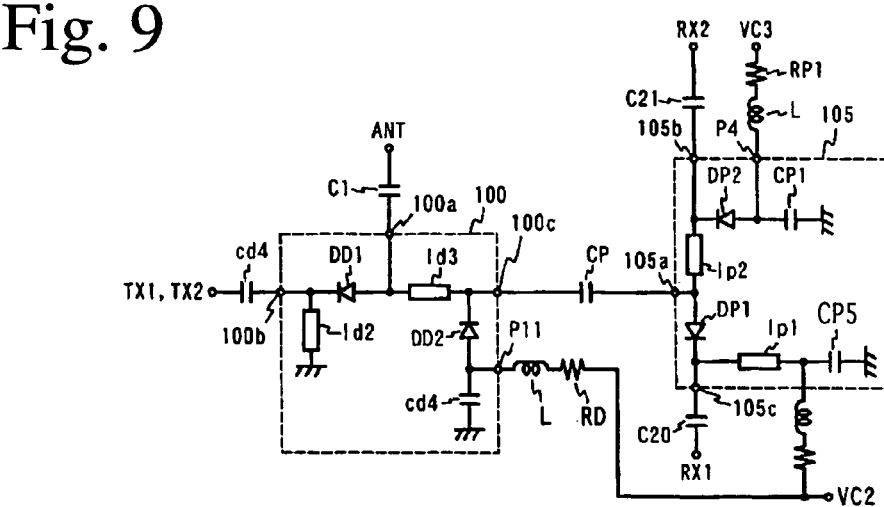
FIG. 9 is a view showing an equivalent circuit of a switch circuit according to a still further embodiment of the present invention.

The equivalent circuit of this switch circuit is shown in FIG. 9. The equivalent circuit of this switch circuit differs from that of the second embodiment in that a capacitor CP5 is disposed between the transmission line lp1 of the second switch 105 and the ground, and that a control circuit VC2 is connected between this transmission line lp1 and the capacitor CP5 via an inductor and a resistor.

When the switch circuit in this embodiment is operated according to the same control logic of the control circuits VC2, VC3 as in the second embodiment, reverse voltage is applied to the diodes DP1, DP2 of the second switch 105 in the transmitting mode of GSM 1800/GSM 1900, resulting in excellent isolation characteristics and attenuated harmonics radiated from the antenna. Incidentally, the control circuit VC2 may be connected between a diode and a capacitor in place of the resistor R, such that reverse voltage is applied to the diodes DP1, DP2 by the switch circuit as in FIG. 3 as the second switch 105, thereby obtaining the same effects.

[4] Forth Embodiment

A switch circuit according to a fourth embodiment of the present invention will be explained below. Because the equivalent circuit of the switch circuit in this embodiment shares many parts with that of the first embodiment, explanation will be concentrated on different parts for simplification.

Figure 10:
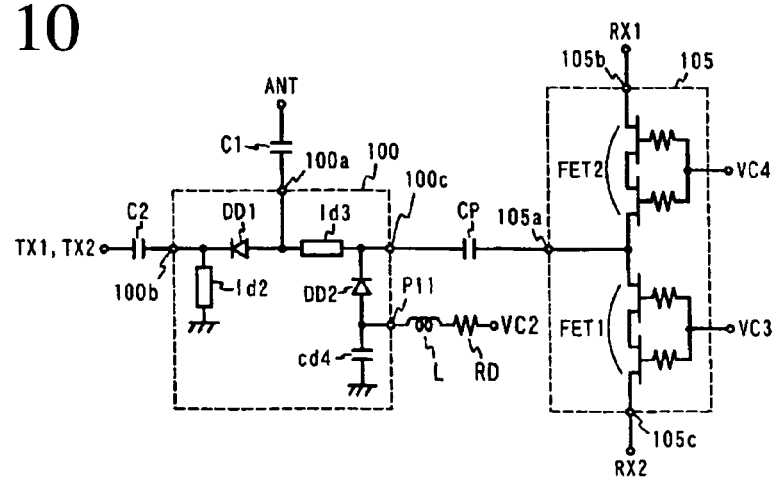
FIG. 10 is a view showing an equivalent circuit of a switch circuit according to a still further embodiment of the present invention.

The equivalent circuit of this switch circuit is shown in FIG. 10. The equivalent circuit of this switch circuit differs from that of the first embodiment in that the second switch 105 is a GaAs switch comprising transistors. The control logic is different between the depression-type transistor and the enhancement-type transistor. For instance, these control logics are shown in Table 5 below. This embodiment can also provide the switch circuit with extremely small leakage of the transmitting signal to the receiving circuit (extremely large isolation). In this embodiment, it is possible to suppress the generation of distortion by connecting pluralities of transistors in series, even when there is leakage in a transmitting signal from the first switch to the second switch.

TABLE 5

| Mode | VC2 | VC3 | VC4 |
|---|---|---|---|
| Depression Type | | | |
| GSM 1800 TX (Transmitting) | V+ | 0 | V− |
| GSM 1900 TX (Transmitting) | V+ | 0 | V− |
| GSM 1800 RX (Receiving) | 0 | V− | 0 |
| GSM 1900 RX (Receiving) | 0 | 0 | V− |
| Enhancement Type | | | |
| GSM 1800 TX (Transmitting) | V+ | V+ | 0 |
| GSM 1900 TX (Transmitting) | V+ | V+ | 0 |
| GSM 1800 RX (Receiving) | 0 | 0 | V+ |
| GSM 1900 RX (Receiving) | 0 | V+ | 0 |

[5] Fifth Embodiment

Figure 11:
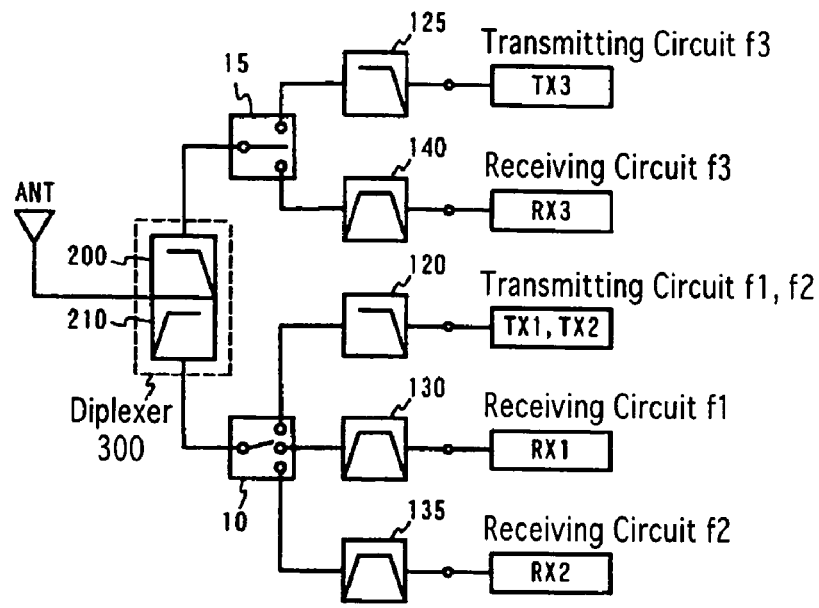
FIG. 11 is a block diagram showing another example of a high-frequency circuit comprising the switch circuit according to one embodiment of the present invention.
Figure 13:
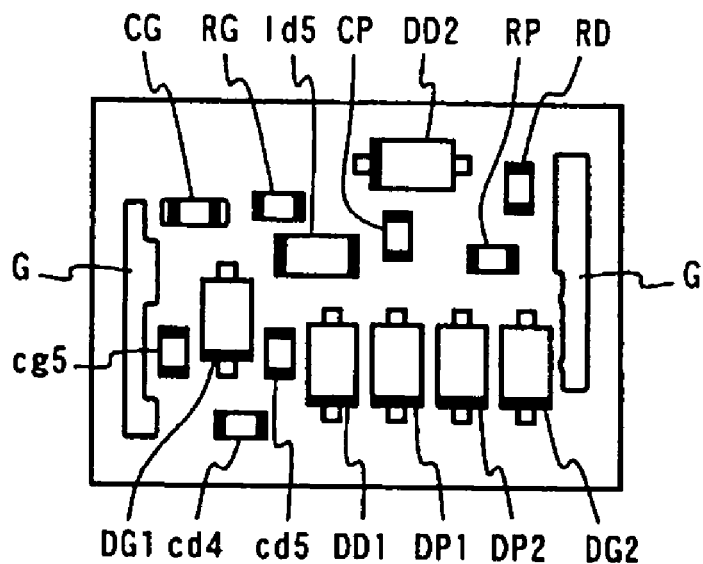
FIG. 13 is a plan view showing a high-frequency composite part comprising the switch circuit according to one embodiment of the present invention.
Figure 14:
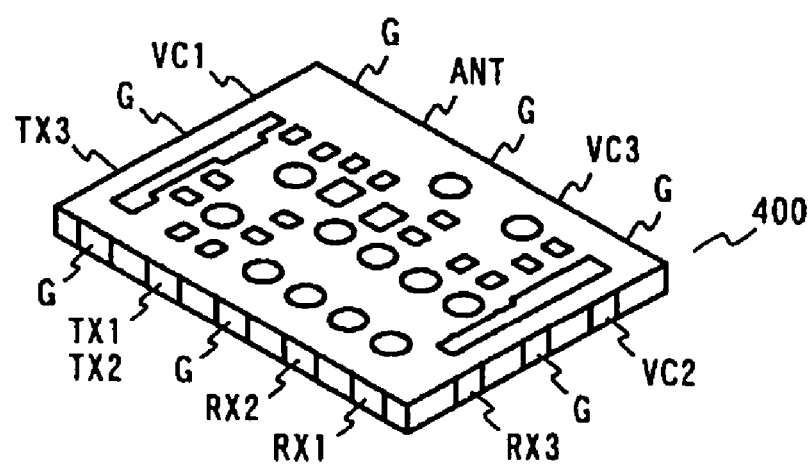
FIG. 14 is a squint view showing a multi-layered substrate for use in the high-frequency composite part shown in FIG. 13.
Figure 15:
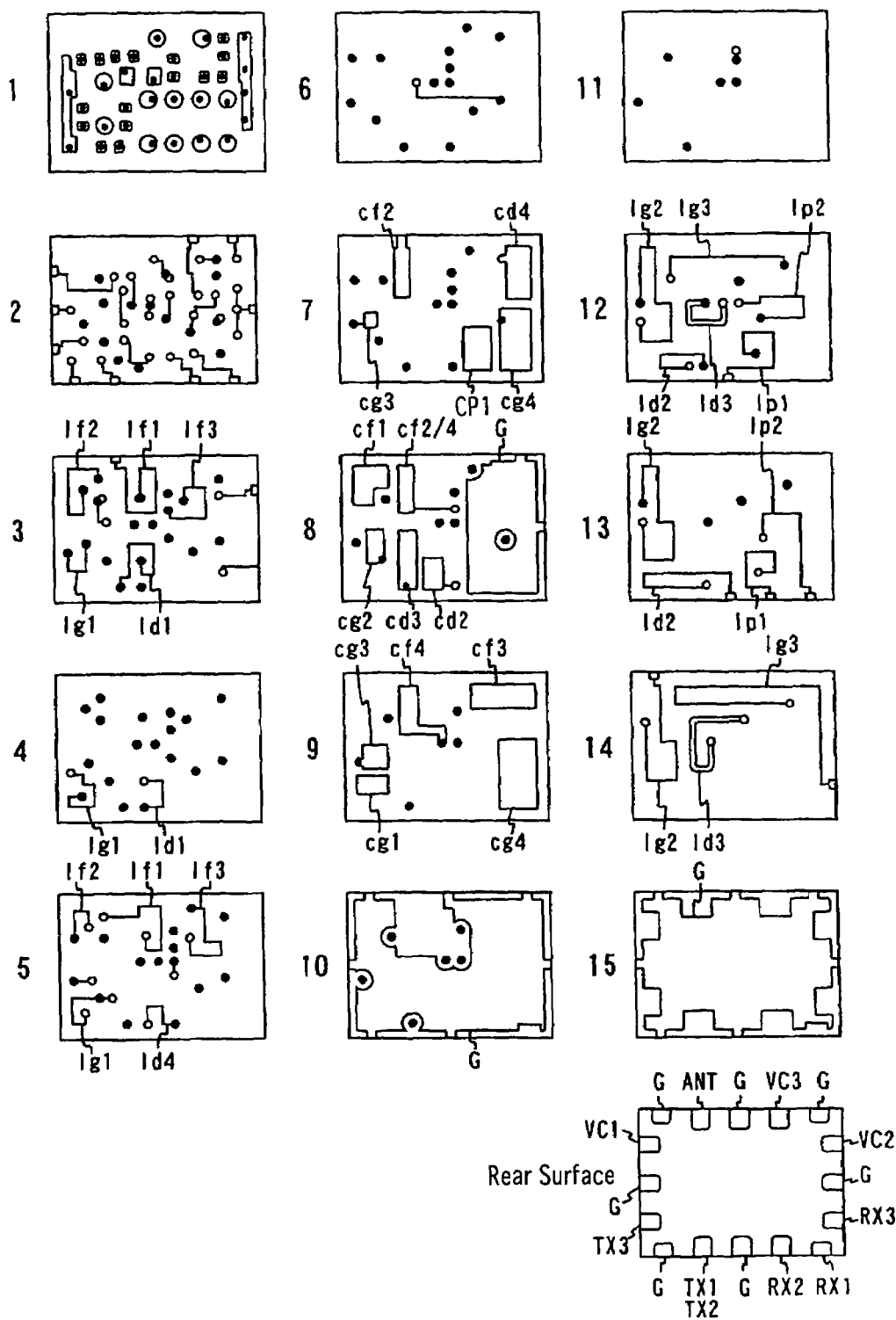
FIG. 15 is an exploded plan view showing a laminate structure of the multi-layered substrate for use in the high-frequency composite part shown in FIG. 13.
Figure 16:
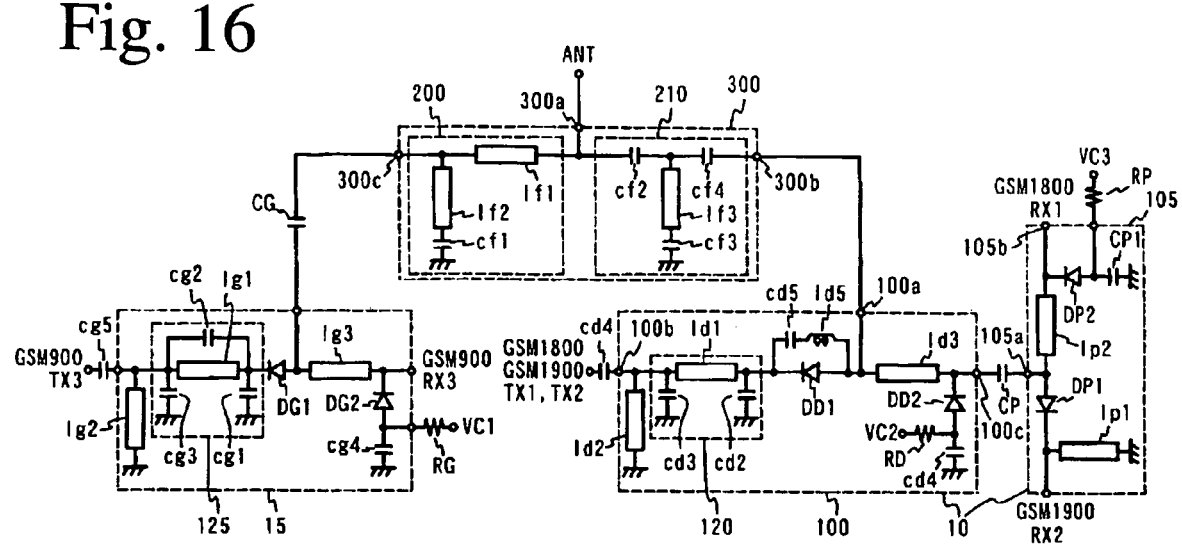
FIG. 16 is a view showing an equivalent circuit of the high-frequency composite part shown in FIG. 13.

The fifth embodiment provides a high-frequency composite part (multiband antenna switch module) comprising a branching circuit (diplexer) 300 and filter circuits 120, 125 integrated in a multi-layered substrate, and the switch circuit 10 of the present invention in a high-frequency circuit handling three communication systems shown in FIG. 11. FIG. 13 is its plan view, FIG. 14 is a squint schematic view showing the multi-layered substrate, FIG. 15 is a development view showing each layer constituting the multi-layered substrate shown in FIG. 14, and FIG. 16 shows the equivalent circuit of the high-frequency composite part.

In this embodiment, the inductors, capacitors and switching elements in the switch circuit 10 are formed in the multi-layered substrate, together with the inductors, capacitors and switching elements constituting the diplexer 300 comprising the first and second filter circuits, the lowpass filter circuits 120, 125 and the switch circuit 15 in the high-frequency circuit shown in FIG. 11. Transmission lines are formed as the inductors in the multi-layered substrate, and diodes as the switching elements and high-capacitance capacitors that cannot be contained in the multi-layered substrate as chip capacitors are mounted onto the multi-layered substrate, thereby constituting a one-chip, tripleband, high-frequency composite part.

The multi-layered substrate constituting this high-frequency composite part may be produced from a low-temperature-cofirable, dielectric ceramic material, by forming green sheets of 20 μm to 200 μm in thickness, printing an Ag-based conductive paste on each green sheet to form a desired electrode pattern, integrally laminating pluralities of green sheets with desired electrode patterns, and firing the multi-layered substrate. The width of most line electrodes is preferably 100 μm to 400 μm. The low-temperature-cofirable, dielectric ceramic materials may be, for instance, (a) $Al_2O_3$-based ceramics containing at least one of $SiO_2$, SrO, CaO, PbO, $Na_2O$ and $K_2O$ as an additional component, (b) $Al_2O_3$-based ceramics containing at least one of MgO, $SiO_2$ and GdO as an additional component, or (c) ceramics based on $Al_2O_3$, $SiO_2$, SrO, $Bi_2O_3$, $TiO_2$, etc.

These laminate green sheets are integrally pressurebonded, and fired at a temperature of about 900° C., to obtain a multi-layered substrate having an outer size of 6.7 mm×5.0 mm×1.0 mm, for instance. Terminal electrodes are formed on the side surfaces of this multi-layered substrate. Incidentally, the terminal electrodes may be formed on the bottom surface of the multi-layered substrate, and the positions of the terminal electrodes may be properly selected.

The internal structure of the multi-layered substrate is shown in FIG. 15. The reference numerals in the figure are the same as in the equivalent circuit shown in FIG. 16. The second transmission line ld3 and the first transmission line lp2 constituting the inductors of the switch circuit 10 of the present invention are formed in a region sandwiched by the ground electrode G formed on the tenth layer and the ground electrode 15 formed on the 15-th layer, together with other transmission lines lp1, ld2 constituting the switch circuit 10 and transmission lines lg2, lg3 constituting the switch circuit 15 of SPDT. Electrode patterns constituting the second transmission line ld3 and the first transmission line lp2 are respectively formed on the 12-th to 14-th layers and connected through viaholes (shown by black circles in the figure). Transmission lines are formed in horizontally different regions, such that they do not overlap in a lamination direction. Such structure can prevent interference between electrode patterns constituting the other circuit elements and transmission lines, thereby improving isolation characteristics.

Impedance matching can be achieved by making the electrode pattern constituting the second transmission line ld3 wider than the electrode pattern constituting the first transmission line lp2, and by making the characteristic impedance of the second transmission line ld3 lower than that of the first transmission line lp2, when the first switch 100 and the second switch 105 are integrated into one multi-layered substrate. In this embodiment, the width of the second transmission line ld3 is 0.25 mm, about two times that of the first transmission line lp2.

The first capacitor cd4 arranged between the diode DD2, the fourth switching element, and the ground is constituted by the ground electrode G formed on the eighth layer and an opposing capacitor electrode formed on the seventh layer, above the ground electrode G formed on the tenth layer. The capacitor electrode preferably does not overlap the other electrode patterns (particularly capacitor electrode patterns) to prevent interference. However, in the case of forming a multi-layered composite part, it is sometimes difficult to prevent the capacitor electrodes from overlapping other electrode patterns. In this embodiment, accordingly, the capacitor electrodes are separate from the other electrode patterns (a line connected to the control terminal VC2 formed on the third layer, and a line connected to the receiving terminal RX1) by at least 100 μm in a lamination direction to prevent interference. The second capacitor CP1 of the second switch 105 is similarly formed on the same layer as the first capacitor cd4, sharing the ground layer G on the eighth layer. With such structure, the high-frequency composite part with excellent isolation and insertion loss characteristics were obtained.

[6] Sixth Embodiment

Figure 17:
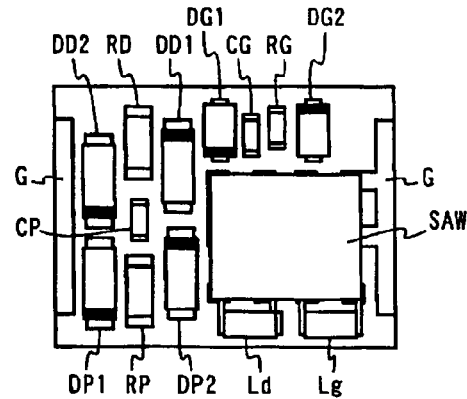
FIG. 17 is a plan view showing another high-frequency composite part comprising the switch circuit according to one embodiment of the present invention.
Figure 18:
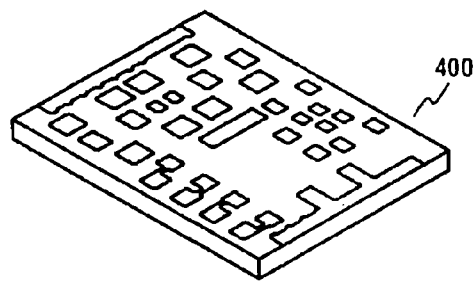
FIG. 18 is a perspective view showing a multi-layered substrate for use in the high-frequency composite part shown in FIG. 17.
Figure 19:
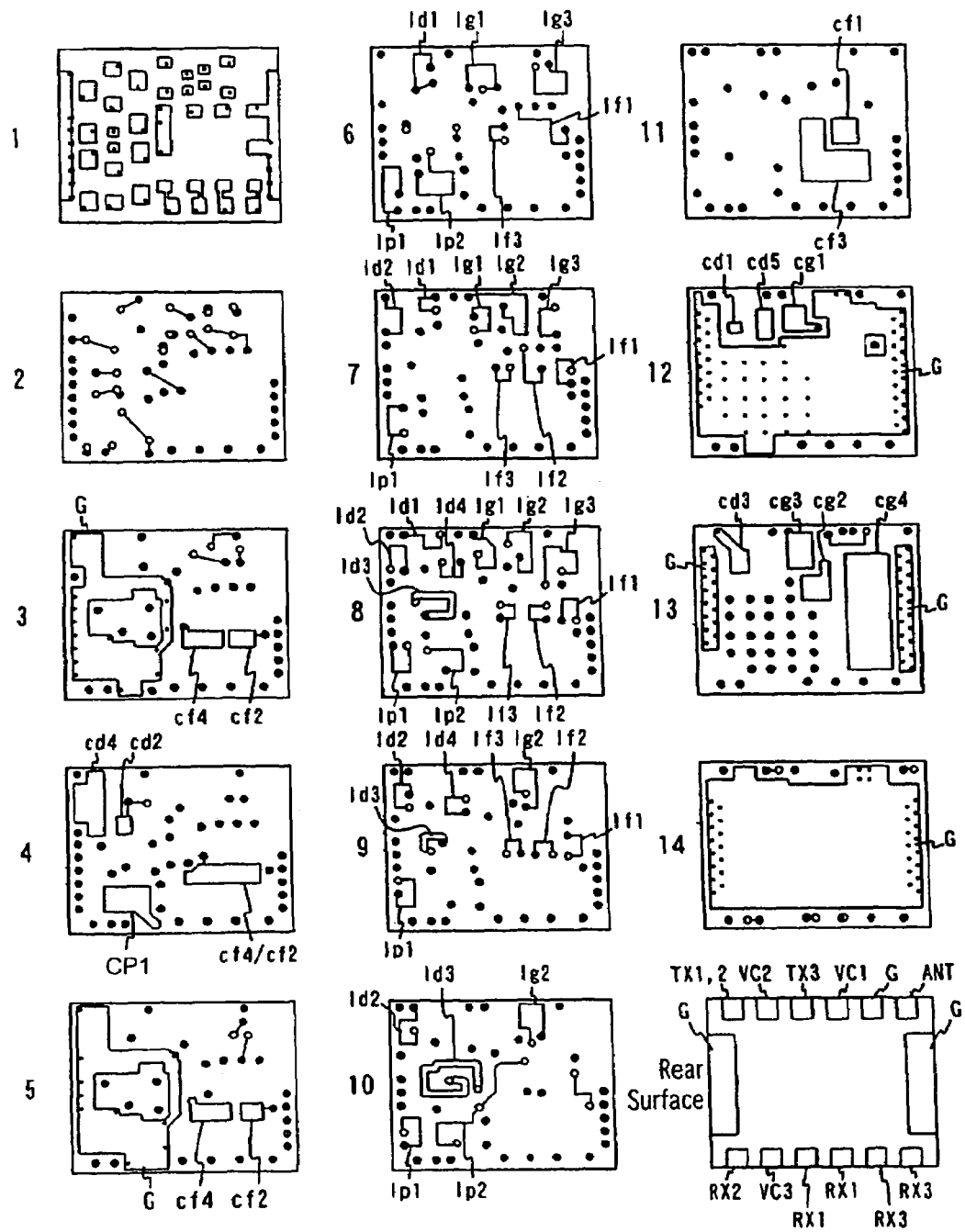
FIG. 19 is an exploded plan view showing a laminate structure of the multi-layered substrate for use in the high-frequency composite part shown in FIG. 17.
Figure 20:
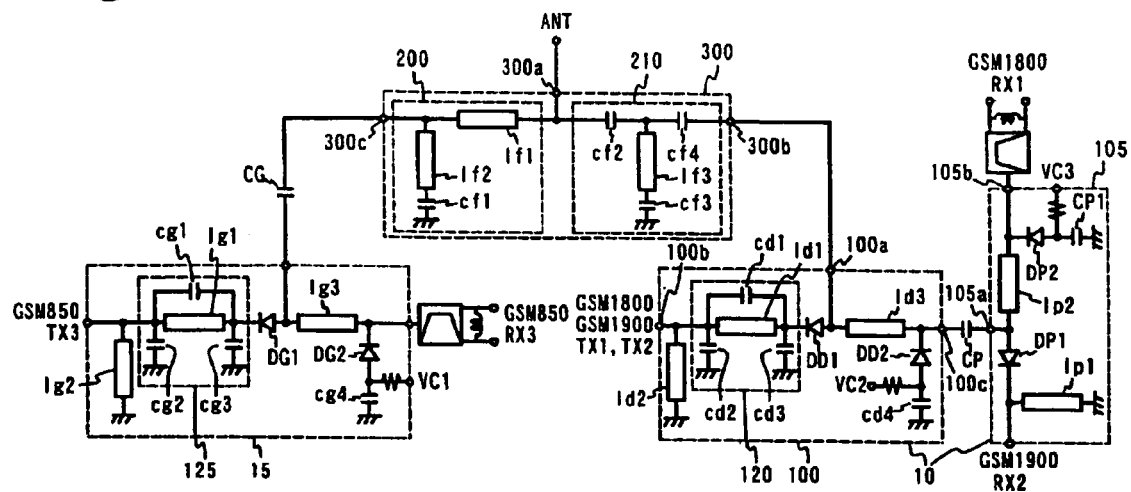
FIG. 20 is a view showing an equivalent circuit of the high-frequency composite part shown in FIG. 17.
Figure 21:
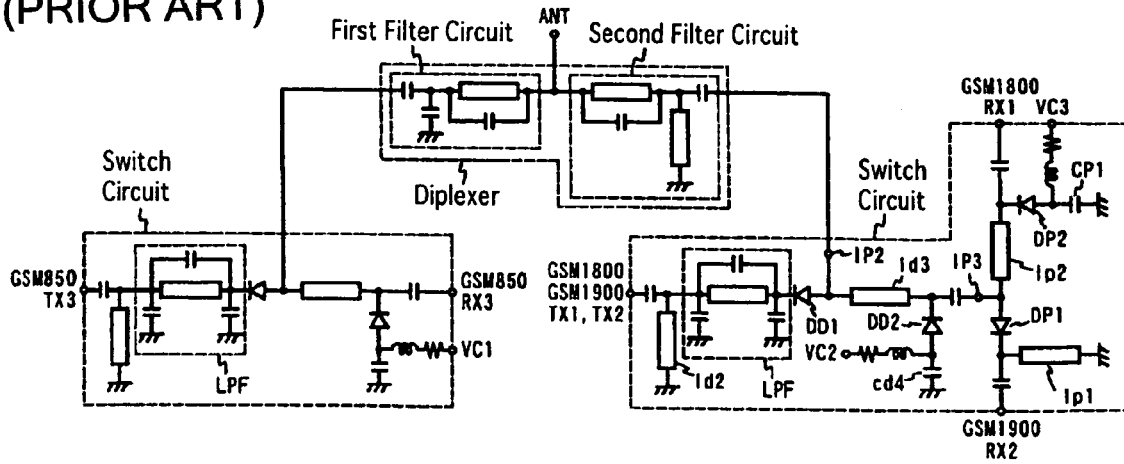
FIG. 21 is a view showing an equivalent circuit of a conventional switch circuit.

In the sixth embodiment, the switch circuit 10 of the present invention is integrated in a multi-layered substrate together with the diplexer 300 and the filter circuits 120, 125, 130, 140 in a high-frequency circuit handling three communication systems shown in FIG. 11, to constitute a high-frequency composite part (multi-band antenna switch module). FIG. 17 is a plan view showing the high-frequency composite part, FIG. 18 is a squint schematic view showing a multi-layered substrate portion of the high-frequency composite part, FIG. 19 is a development view showing the structure of each layer constituting the multi-layered substrate of FIG. 18, and FIG. 20 is a view showing the equivalent circuit of the high-frequency composite part.

In this embodiment, a second transmission line ld3 is formed in a region sandwiched by the ground electrode G formed on the 12-th layer and the ground electrode G formed on the fifth layer, and part of the ground electrode G formed on the fifth layer that overlaps the second transmission line ld3 is cut off. Accordingly, the second transmission line ld3 has higher characteristic impedance than when the ground electrode G is not cut off, thereby making it possible to achieve impedance matching when the first switch 100 and the second switch 105 are integrated into one multi-layered substrate. Also, an electrode pattern formed on the eighth layer to constitute the second transmission line ld3 does not overlap electrode patterns constituting other circuit elements in a lamination direction. In this embodiment, the electrode pattern is separate from connection lines formed on the second layer by at least 100 μm, to prevent interference.

Further, the first capacitor cd4 disposed between the diode DD2, the fourth switching element, and the ground is constituted by the capacitor electrode patterns formed on the fourth layer, in a region sandwiched by the ground electrode G formed on the fifth layer and the ground electrode G formed on the third layer. Such structure prevents interference with the connection lines on the second layer. This embodiment provides the high-frequency composite part with excellent isolation and insertion loss characteristics.

Figure 12:
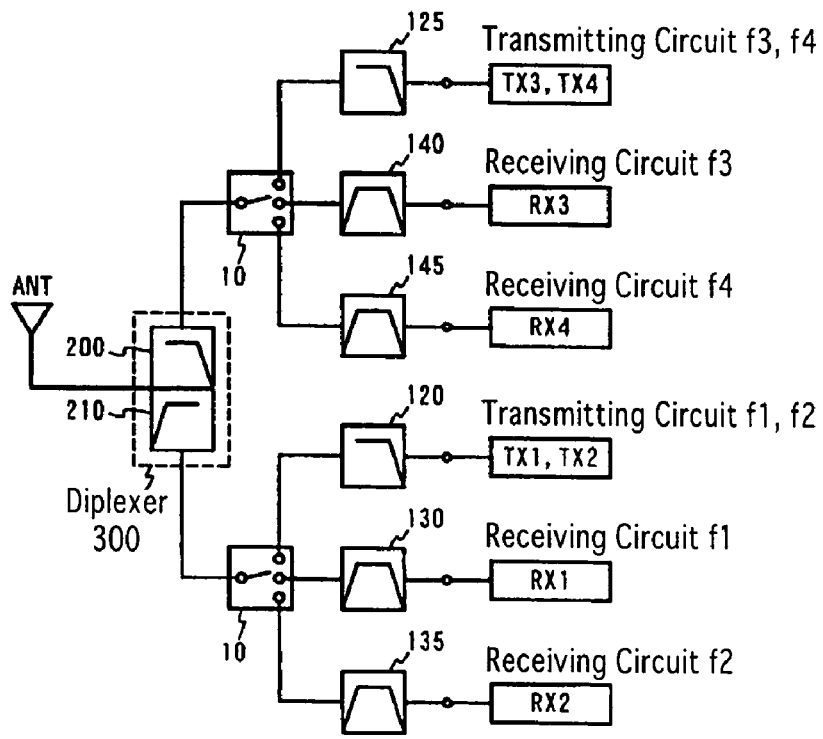
FIG. 12 is a block diagram showing a further example of a high-frequency circuit comprising the switch circuit according to one embodiment of the present invention.

The switch circuit of the present invention has been explained in detail without intention of restricting the present invention thereto, and various modifications may be added unless they deviate from the scope of the present invention. Also, communication systems used in the switch circuit of the present invention are not restricted to those in the above embodiments, and the present invention is applicable to combinations of different communication systems having partially overlapping transmitting frequencies and receiving frequencies [for instance, GSM 850 (transmitting frequency: 824 MHz to 849 MHz, receiving frequency: 869 MHz to 894 MHz) and EGSM (transmitting frequency: 880 MHz to 915 MHz, receiving frequency: 925 MHz to 960 MHz)]. For instance, the present invention is applicable to high-frequency circuit blocks handling four different communication systems shown in FIG. 12.

The present invention provides the switch circuit which has a capable of switching transmitting circuits and receiving circuits with extremely small leakage of transmitting signals to the receiving circuits (extremely large isolation) in pluralities of communication systems which the frequency bandwidth of transmitting signals and the frequency bandwidth of receiving signals partially overlap, and the high-frequency composite part comprising such switch circuit.

What is claimed:

1. A switch circuit for selectively switching the connection of a receiving circuit or a transmitting circuit for two communication systems, in which a receiving frequency bandwidth in a first communication system partially overlaps a transmitting frequency bandwidth in a second communication system, and an antenna circuit, said switch circuit comprising switching elements, inductors, and capacitors, including a first switch and a second switch, said first switch comprising a first port connected to said antenna circuit, a second port connected to said transmitting circuit of said first and second communication systems, and a third port connected to said second switch, and said second switch comprising a fourth port connected to said first switch via a capacitor, a sixth port connected to said receiving circuit of said first communication system, and a fifth port connected to said receiving circuit of said second communication system;

a first inductor being disposed between said fourth port and said fifth port;

a first switching element being disposed between said fifth port and a ground;

a second switching element being disposed between said fourth port and said sixth port; and said first and second switching elements being controlled in an ON state while said the transmitting circuit of said first and second communication systems is connected to said antenna circuit.

2. A switch circuit for selectively switching the connection of a receiving circuit or a transmitting circuit for two communication systems, in which a receiving frequency bandwidth in a first communication system partially overlaps a transmitting frequency bandwidth in a second communication system, and an antenna circuit, said switch circuit comprising switching elements, inductors and capacitors, including a first switch and a second switch, said first switch comprising a first port connected to said antenna circuit, a second port connected to said transmitting circuit of said first and second communication systems, and a third port connected to said second switch, and said second switch comprising a fourth port connected to said first switch via a capacitor, a sixth port connected to said receiving circuit of said first communication system, and a fifth port connected to said receiving circuit of said second communication system;

a first inductor being disposed between said fourth port and said fifth port;

a first switching element being disposed between said fifth port and a ground;

a second switching element being disposed between said fourth port and said sixth port; and said first and second switching elements being controlled in an OFF state, while the transmitting circuit of said first and second communication systems is connected to said antenna circuit.

3. The switch circuit according to claim 1 or 2, wherein said first switch comprises a third switching element disposed between said first port and said second port, a second inductor disposed between said first port and said third port, and a fourth switching element disposed between said third port and said ground, said third and fourth switching element being controlled in an ON state while the transmitting circuit of said first and second communication systems is connected to said antenna circuit.

4. The switch circuit according to claim 3, wherein said fourth switching element is a diode, and a first capacitor is disposed in series between said diode and said ground.

5. The switch circuit according to claim 3, wherein said first switching element is a diode, and a second capacitor is disposed in series between said diode and said ground.

6. The switch circuit according to claim 3, wherein said first inductor and said second inductor comprise transmission lines with different characteristic impedances.

7. The switch circuit according to claim 6, wherein a transmission line comprising said first inductor has a higher characteristic impedance than that of a transmission line comprising said second inductor.

8. The switch circuit according to claim 1 or 2, wherein the operation current of said second switching element is lower than that of said first switching element.

9. The switch circuit according to claim 8, wherein the operation current of said second switching element is 2.5 mA or less.

10. A high-frequency composite part comprising the switch circuit recited in claim 1 or 2, wherein said switching elements, said inductors and said capacitors are contained in or mounted onto a multi-layered substrate obtained by laminating a plurality of ceramic sheets, and connected by a connection means formed in or on said multi-layered substrate.

11. The high-frequency composite part according to claim 10, wherein said first inductor and said second inductor are separately formed as transmission lines in horizontally different regions of said multi-layered substrate.

12. The high-frequency composite part according to claim 11, wherein transmission lines comprising said second inductor and said first inductor are formed in a region sandwiched by ground electrodes formed in said multi-layered substrate.

13. The high-frequency composite part according to claim 12, wherein a transmission line comprising said second inductor does not overlap said ground electrode at least partially in a lamination direction on said multi-layered substrate.

14. The high-frequency composite part according to claim 13, wherein the width of a transmission line comprising said second inductor is different along at least a portion of the transmission line comprising said second inductor from that of a transmission line comprising said first inductor.

15. The high-frequency composite part according to claim 11, wherein said second inductor comprises connecting a plurality of transmission lines formed on different layers through via holes.

16. The high-frequency composite part according to claim 10, wherein said first capacitor disposed between said fourth switching element and said ground is contained in said multi-layered substrate, and wherein a hot-side electrode of said first capacitor is disposed above an upper one of ground electrodes sandwiching said second inductor and a transmission line comprising said first inductor.

17. The high-frequency composite part according to claim 16, wherein the hot-side electrode of said first capacitor and a hot-side electrode of said second capacitor are formed on the same layer.

* * * * *